E. R. ROBINSON.
CREAM GAGE.
APPLICATION FILED APR. 30, 1915.
1,186,334.
Patented June 6, 1916.
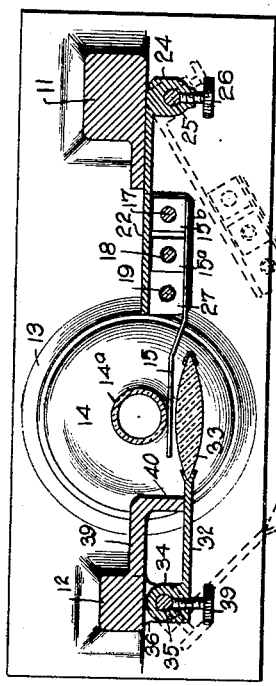
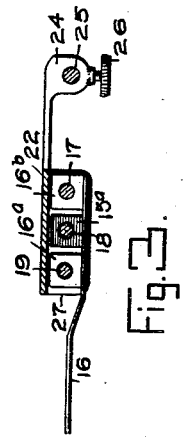
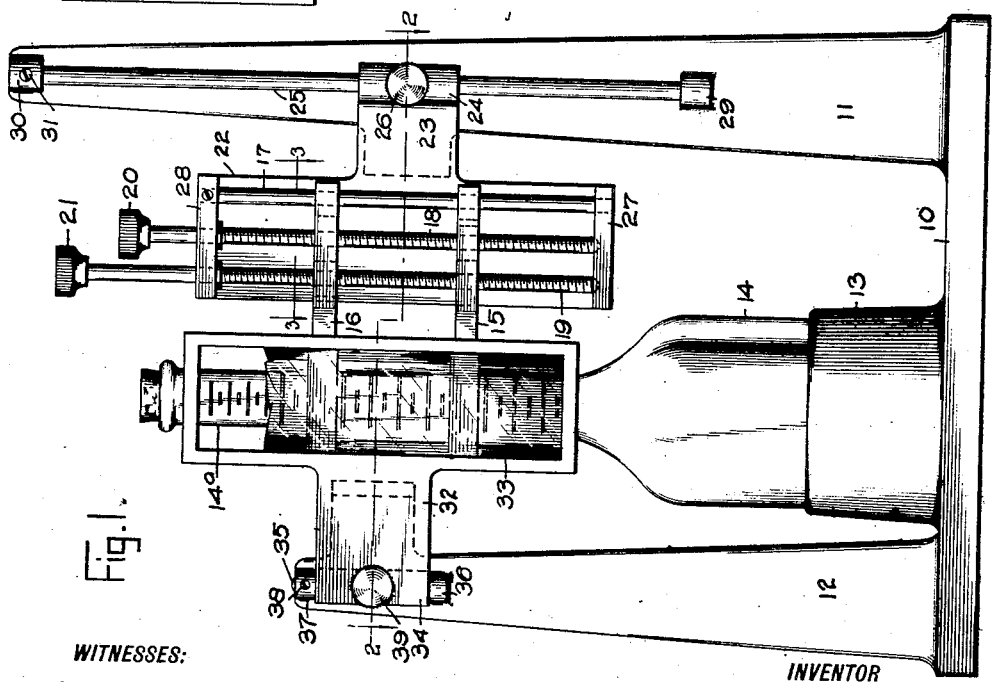
WITNESSES:
INVENTOR
Ernest R. Robinson.
BY
ATTORNEY

UNITED STATES PATENT OFFICE.

ERNEST REYNOLDS ROBINSON, OF CHATHAM, NEW YORK.

CREAM-GAGE.

1,186,334.

Specification of Letters Patent. Patented June 6, 1916.

Application filed April 30, 1915. Serial No. 24,874.

*To all whom it may concern:*

Be it known that I, ERNEST R. ROBINSON, a citizen of the United States, and a resident of Chatham, in the county of Columbia and State of New York, have invented a new and Improved Cream-Gage, of which the following is a full, clear, and exact description.

My invention relates to adjustable indicating means for gaging the amount of cream and butter fat in milk.

Comprised in the invention is a stand of suitable form, having means to support a bottle in an upright position. Horizontally disposed gage fingers are separately adjustable vertically under the influence of adjusting screws to position the gages relative to each other and to the neck of the milk bottle. The fingers and their operating screws are mounted on a carriage adapted to be bodily adjusted vertically, or to be swung to or from the position of the bottle. On the stand also is a swinging frame carrying a magnifying glass whereby said glass may be swung in front of the graduated neck of the bottle, or swung away from the bottle.

The invention will be particularly explained in the specific description following.

Reference is had to the accompanying drawings forming part of this specification, in which similar characters of reference indicate corresponding parts in all the views, and in which:

Figure 1 is a front elevation of a gage embodying my invention; Fig. 2 is a horizontal section on the line 2—2 of Fig. 1; and Fig. 3 is a detail horizontal section on the line 3—3 Fig. 1.

In carrying out my invention in practice, a suitable support is provided, which may consist of a base 10 and standards 11, 12, at the ends of the base. Between the standards a socket or other suitable holder 13 is provided to receive a bottle 14 having an elongated graduated neck $14^a$.

Gage fingers 15, 16, are provided, disposed substantially horizontal, one above the other. The gage fingers are movable vertically on a guide rod 17, the finger 15 being under the influence of a vertical screw 18, and the finger 16 under the influence of a vertical screw 19. Said screws are provided respectively with knurled heads 20, 21, or equivalent means, for turning the same.

The guide rod 17 and the screws 18, 19, are on a carriage 22, the arm 23 of which has a sleeve 24 slidable on a rod 25 on the standard 11, the sleeve being adapted to be secured at a given height by a set screw 26, or the like. The arrangement is such that the carriage may be adjusted vertically on the rod 25; the carriage may be swung about the said rod as an axis to position the gage fingers adjacent to the bottle neck $14^a$, and the gage fingers may be adjusted vertically along the bottle neck and relatively to each other by the screws 18, 19. The carriage 22 has a bottom flange 27 in which the lower ends of the screws are centered, and an upper flange 28 in which plain portions of said screws have bearings. To give proper guided movement to the gage fingers, the finger 15 has a block $15^a$ threaded onto the screw 18 and a block $15^b$ having an orifice through which the rod 17 passes. Similarly, the gage finger 16 has a block $16^a$ (see Fig. 3) threaded onto the screw 19 and a block $16^b$ having an orifice through which the guide rod 17 passes. The rod 25 in the example shown rises from a bracket member 29 and at the upper end is received in a bracket member 30; a set screw 31 may be employed in the latter bracket, if desired. On the opposite standard 12 there is mounted to swing a frame 32 fitted with a magnifying lens 33. Said frame has a sleeve 34 through which the pivot pin 35 passes, said pivot pin being supported in bracket members 36, 37, and secured by a set screw 38. A set screw 39 serves to hold the swinging frame 32 in fixed position in front of the graduated neck $14^a$.

The described construction affords practical means for carrying my invention into effect, and I would state in conclusion, that I do not limit myself strictly to the mechanical details herein illustrated, since manifestly, the same can be considerably varied without departure from the spirit of the invention, as defined in the appended claims.

That the use of my improved gage may be understood, I would explain that the addition of acid to milk by dairymen causes the cream in the milk to rise into the graduated neck of the bottle when water is added after the chemical action of the acid on the milk has taken place. The cream having risen in the neck of the bottle, the gage fingers are adjusted to indicate the position of the top and the bottom of the cream to gage the quantity of cream in the bottle neck. The gage fingers are then moved in unison until the lower gage finger is at zero so that the quantity of cream may be instantly read off.

Having thus described my invention, what I claim as new and desire to secure by Letters Patent, is:

1. A gage of the character described, comprising a stand having means to support a milk bottle, gage fingers, means mounting the gage fingers to swing in a direction transverse to the direction of a supported milk bottle, and means to move said fingers relatively to each other and along the neck of the milk bottle.

2. A gage of the character described, comprising a stand adapted to receive a milk bottle, and gage fingers mounted to be swung transversely and adjustable vertically relatively to a supported bottle.

3. A cream gage device for use in connection with a bottle having a graduated neck, said device including gage elements movable relatively to each other to vary the distance therebetween, means on which said gage elements are supported substantially horizontal to be positioned alongside of the bottle neck to range across the same, and a support on which said means are mounted to swing laterally.

4. In a device of the character described, gage elements, means supporting said elements to be moved vertically relative to each other, and a support on which said first-mentioned means is mounted to be swung in a direction transverse to the relative vertical movement of the gage elements.

5. In a device of the character described, a stand, a member vertically slidable on said stand, a guide rod on said slidable member, gage fingers slidable on said guide rod, and separate actuating means for the said gage fingers to move the same on the said rod.

6. In a device of the character described, means to support a bottle, gage means, means for supporting the gage means at one side of the first means, a magnifying lens, and means for supporting the magnifying lens at the opposite side of said first means.

7. In a device of the character described, a support adapted to receive a bottle, gage means, means to support the gage means, said gage means comprising elements vertically adjustable on their supporting means and mounted to swing transversely thereon, a magnifying lens and means mounting said lens to swing transversely in the opposite direction from the gage means.

8. In a device of the character described, a support adapted to receive a milk bottle, gage means on said support in position to be disposed adjacent to a bottle when the latter is in place on the support, and a magnifying lens disposed in a position to lie in front of a supported bottle.

9. In a gage, gage fingers, means mounting said fingers to move toward and from each other, means pivotally mounting the said fingers to swing in an arc, movable means carrying the first means to move the fingers in unison in adjusted relation, in a direction transverse to their pivotal movement, and means to support an article to be gaged in a position adjacent to the fingers.

10. In a device of the character described, a support, a test bottle having a graduated neck, there being means on said support to removably position said bottle thereon, and gage elements mounted on said support, said elements being movable relatively to each other along the bottle neck and movable in unison with each other in adjusted relation along said bottle neck.

11. In a device of the character described, a support, a test bottle having a graduated neck, there being means on said support to removably position said bottle thereon, and gage elements mounted on said support, said elements being movable relatively to each other along the bottle neck and movable in unison with each other in adjusted relation along said bottle neck and being also mounted to swing toward and from the bottle neck.

12. In a device of the character described, a stand, a bottle having a graduated neck and removably supported on said stand in vertical position, a member vertically slidable on said stand, along side the bottle neck, a guide rod on said slidable member, gage fingers slidable on said guide rod, and separate actuating means on the said fingers to move the same on said rod.

In testimony whereof I have subscribed my name to this specification in the presence of two subscribing witnesses.

ERNEST REYNOLDS ROBINSON.

Witnesses:
 EDWARD AKIN,
 W. F. SALMON.